United States Patent
Liu et al.

(10) Patent No.: US 9,204,247 B2
(45) Date of Patent: Dec. 1, 2015

(54) PROXIMITY-BASED NOTIFICATIONS FOR PHOTOS

(75) Inventors: Sean Yaoxing Liu, Sunnyvale, CA (US); Sabrina Chueh Ellis, Cupertino, CA (US)

(73) Assignee: Google Inc., Mountain View, CA (US)

( * ) Notice: Subject to any disclaimer, the term of this patent is extended or adjusted under 35 U.S.C. 154(b) by 626 days.

(21) Appl. No.: 13/584,640

(22) Filed: Aug. 13, 2012

(65) Prior Publication Data
US 2015/0172853 A1   Jun. 18, 2015

(51) Int. Cl.
| | | |
|---|---|---|
| H04N 5/225 | (2006.01) | |
| H04W 4/02 | (2009.01) | |
| H04W 68/00 | (2009.01) | |
| H04W 64/00 | (2009.01) | |
| H04W 8/18 | (2009.01) | |

(52) U.S. Cl.
CPC ............. *H04W 4/02* (2013.01); *H04W 8/186* (2013.01); *H04W 64/00* (2013.01); *H04W 68/005* (2013.01)

(58) Field of Classification Search
CPC .............. G06F 17/30386; G06F 17/30722
USPC .......... 709/204, 205, 206, 227; 707/748, 751, 707/758; 705/26.1, 14.49, 14.16, 14.13
See application file for complete search history.

(56) References Cited

U.S. PATENT DOCUMENTS

| | | | | |
|---|---|---|---|---|
| 8,850,325 | B2 * | 9/2014 | Cheng et al. | ........... 715/738 |
| 2005/0097173 | A1 * | 5/2005 | Johns et al. | ........... 709/206 |
| 2005/0143097 | A1 * | 6/2005 | Wilson et al. | ........ 455/456.3 |
| 2013/0089243 | A1 * | 4/2013 | Sauve et al. | ........... 382/118 |
| 2013/0286223 | A1 * | 10/2013 | Latta et al. | ........... 348/207.1 |

OTHER PUBLICATIONS

"Give and Take: A study of Consumer Photo-Sharing Culture and Practice"—Miller et al, GA Tech Univ., Apr. 2007 http://www.cc.gatech.edu/~keith/pubs/chi2007-photosharing.pdf.*

* cited by examiner

*Primary Examiner* — Randy Scott
(74) *Attorney, Agent, or Firm* — Dority & Manning, P.A.

(57) ABSTRACT

Various aspects of the subject technology relate to systems, methods, and machine-readable media for a proximity-based notification. A system may be configured to receive user location information for a user and member location information for a member of a social graph belonging to the user, determining, based on the user location information and the member location information, that the member is located within a threshold distance of the user, and generating a notification to the user based on photographs that include both the user and the member.

20 Claims, 5 Drawing Sheets

100

PROXIMITY-BASED NOTIFICATIONS FOR PHOTOS

BACKGROUND

The present disclosure generally relates to notifications and, in particular, proximity-based notifications.

Users often take photographs with friends, acquaintances, or other members of the user's social network. Sometimes, the user or others in the photos may post the photos on a social networking site that maintains a record of the user's social network (e.g., the user's social graph or social relationships with others). When these photos are posted, the social networking site may allow the user to identify (e.g., tag) individuals in the photos.

SUMMARY

Various aspects of the subject technology relate to a system for a proximity-based notification. The system may include one or more processors and a machine-readable medium comprising instructions stored therein, which when executed by the one or more processors, cause the one or more processors to perform operations. The operations may include receiving user location information for a user and member location information for a member of a social graph belonging to the user, determining, based on the user location information and the member location information, that the member is located within a threshold distance of the user, calculating a number of photographs for the user that are associated with both the user and the member, and generating a notification to the user if the number of photographs is less than a threshold number of photographs.

Other aspects of the subject technology relate to a method for generating a proximity-based notification. The method may include receiving user location information for a user and member location information for a member of a social graph belonging to the user, determining, based on the user location information and the member location information, whether the member is located within a threshold distance of the user, calculating a number of photographs for the user that include both the user and the member, and generating a notification to the user if the member is located within the threshold distance of the user and if the number of photographs is less than a threshold number of photographs.

Various aspects of the subject technology relate to a non-transitory machine-readable medium comprising instructions stored therein, which when executed by a machine, cause the machine to perform operations for generating a proximity-based notification. The operations may include receiving user location information for a user and member location information for a member of a social graph belonging to the user, determining, based on the user location information and the member location information, whether the member is located within a threshold distance of the user, calculating a number of photographs for the user that are associated with both the user and the member, and generating a notification to the user if the member is located within the threshold distance of the user and if the number of photographs is less than a threshold number of photographs.

Other aspects of the subject technology relate to a method for generating a proximity-based notification. The method may include receiving user location information for a user and member location information for a member of a social graph belonging to the user, determining, based on the user location information and the member location information, whether the member is located within a threshold distance of the user, identifying a date of a most recent photograph that includes both the user and the member, and generating a notification to the user if the member is located within the threshold distance of the user and if the date of the most recent photograph is before a threshold date.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
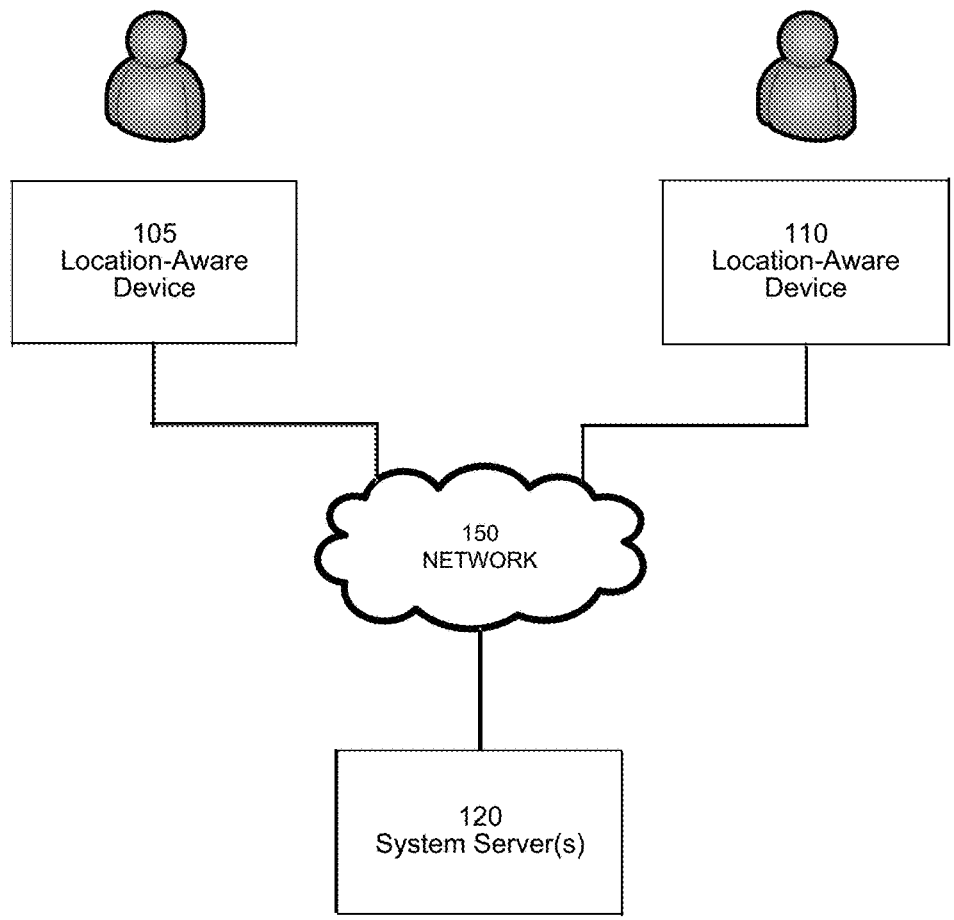
FIG. 1 is a block diagram illustrating an example environment in which a user may be provided with a notification about a member of the user's social graph that is nearby, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

Certain services, such as a social networking website or a photo sharing website, allow users to upload, store, or display photos. In many instances, a user may have many photos with one person because the person may have easy access to a camera, enjoy taking photos, or have a habit of taking many photos. At the same time, the user may have very few or no photos with another person, who may be a close friend, because neither person happens to take many pictures. Looking back after some time, the user may find this result regrettable.

Various aspects of the subject technology relate to systems and methods for providing a user with a proximity-based notification to take a photo with a nearby member of the user's social graph. The term "social graph" as used herein encompasses its plan and ordinary meaning, including, but not limited to a list of contacts for the user or people that the user has some relationship with.

The social graph may also indicate, for example, what kind of relationship each member of the social graph has with the user or a group or social circle that each member is associated with. The term "social circle" as used herein encompasses its plain and ordinary meaning, including, but not limited to a set or group of members or contacts. The social graph of a user may be stored and managed by a service such as, for example, a social networking website.

According to one aspect, a system is configured to receive location information (e.g., location coordinates) from location-aware devices associated with the user and members of the user's social network (e.g., the user's social graph stored in a data repository). Based on the location information for the user and for the members of the user's social network, the system identifies one or more members of the user's social graph that are within a threshold distance of the user (e.g., the member is near or in the vicinity of the user).

A notification is generated based on photographs that include both the user and a member that is within the threshold distance of the user. In one aspect, for each member that is within the threshold distance of the user, the system may determine the number of photographs associated with the user's profile (e.g., the user's social networking profile) that include both the user and the member. If the number of photographs that include both the user and the member is at or below a threshold number of photographs (e.g., 3 or 0), the system may generate a notification suggesting that the user and the member take a photo together.

Once the notification is generated by the system, it may be transmitted to the user's device. The notification may cause the user's device to vibrate, to display a message, play a notification sound, or provide any other notification or combination of notifications to the user. According to one aspect, in addition to notifying the user, the user device may also automatically activate a camera on the device to make it easier for the user to take a photo with the member.

FIG. 1 is a block diagram illustrating an example environment 100 in which a user may be provided with a notification about a member of the user's social graph that is nearby, in accordance with various aspects of the subject technology. Although FIG. 1 illustrates a client-server network environment 100, other aspects of the subject technology may include other configurations including, for example, peer-to-peer environments.

The network environment includes one or more location-aware devices 105 and 110 and one or more system servers 120 connected via a network 150 (e.g., the Internet). The network 150 may include, for example, any one or more of a cellular network, a satellite network, a personal area network (PAN), a local area network (LAN), a wide area network (WAN), a broadband network (BBN), the Internet, and the like. In some cases, the network 150 may include a combination of different networks.

Each location-aware 105 may be any machine able to communicate with the system servers 120 via the network 150, receive a notification from the system servers 120, and notify a user. For example, location-aware devices 105 and 110 may include a mobile device such as a tablet, a personal digital assistant (PDA), a laptop, or any other machine with a processor, memory, and location-determining capabilities. For example, a location-aware device 105 may be, for example, a smart phone with global positioning system (GPS) capabilities.

Some location-aware devices 105 may also include a camera and/or one or more applications, such as a web browser or a dedicated program (e.g., an "app" for a mobile device). The applications may be configured to enable a user to interact with a services hosted by the system servers 120 and receive notifications from the system servers 120. The notifications may be in the form of a visual notification (e.g., a user interface element displayed on a screen of the location-aware device 105), an audible notification (e.g., a ring or beep), or a haptic notification (e.g., a vibration).

The one or more system servers 120 may be computing machines having a processor, a memory, and communications capability that may be used transmit notifications to location-aware devices 105 and 110. In some cases, the system servers 120 may also host systems that provide various other services such as a social network service or photo sharing service.

Figure 2:
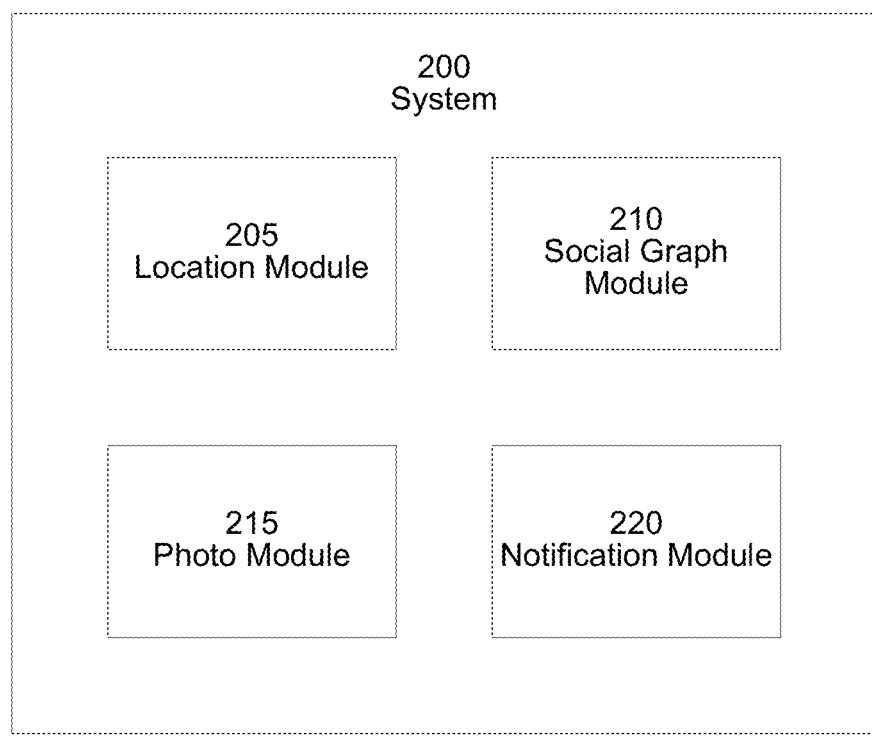
FIG. 2 is a block diagram illustrating an example system configured to provide a user with proximity-based notifications to encourage a user to take a picture, in accordance with various aspects of the subject technology.

FIG. 2 is a block diagram illustrating an example system 200 configured to provide a user with proximity-based notifications to encourage a user to take a picture, in accordance with various aspects of the subject technology. The system 200 may include a location module 205, a social graph module 210, a photo module 215, and a notification module 220. In other aspects, however, the system 200 may include additional modules, fewer modules, or different modules.

The social graph module 210 may be configured to manage and store a social graph of a user. The social graph of a user may be used in the context of a social networking service or a photo sharing service and may include a list of contacts for a user. The contacts in the social graph may further be grouped together into social circles or categorized based on one or more characteristics (e.g., the relationship between a user and a member of the user's social graph).

The social graph module 210 may also be configured to determine a degree of closeness between a user and a member of the user's social graph. For example, the social graph module 210 may calculate a value representing the degree of closeness based on interactions between the user and the member on a social network (e.g., the number and/or type of interactions), the number of times the member is referenced on the user's social networking profile, or the number of times the user is referenced on the member's social networking profile.

The location module 205 may be configured to receive location information from a location-aware device associated with the user and location information from other location-aware devices associated with members of the user's social graph. The location information from the location-aware devices may be in the form of, for example, location coordinates such as GPS coordinates. Using the received location information, the location module 205 may determine whether one or more members of the user's social graph is within a threshold distance of the user (e.g., 15 feet).

The photo module 215 may be configured to calculate, for each member of the user's social graph, the number of the user's photographs that include both the user and the member. The photo module 215 may determine that a user's photograph includes the user and the member of the user's social graph if, for example, both the user and the member are tagged in the photograph or if both the user and the member are detected in the photograph using facial recognition techniques. The photo module 215 may access the user's photographs on the user's social networking profile, on the user's photo-sharing account, or on any other image repository (e.g., the user's home computer, camera, or mobile device). In some cases, the photo module 215 request authorization to access different sources of the user's photographs before attempting to access those sources.

If the user and a member of the user's social graph are within a threshold distance and the number of the user's photographs that include both the user and the member is less than a threshold number of photographs, the notification module may be configured to generate a notification for the user. The notification may inform the user that the member is nearby, inform the user that the user and the member only have a certain number of photographs together, encourage the user to take a picture with the member, or a combination of these.

Figure 3:
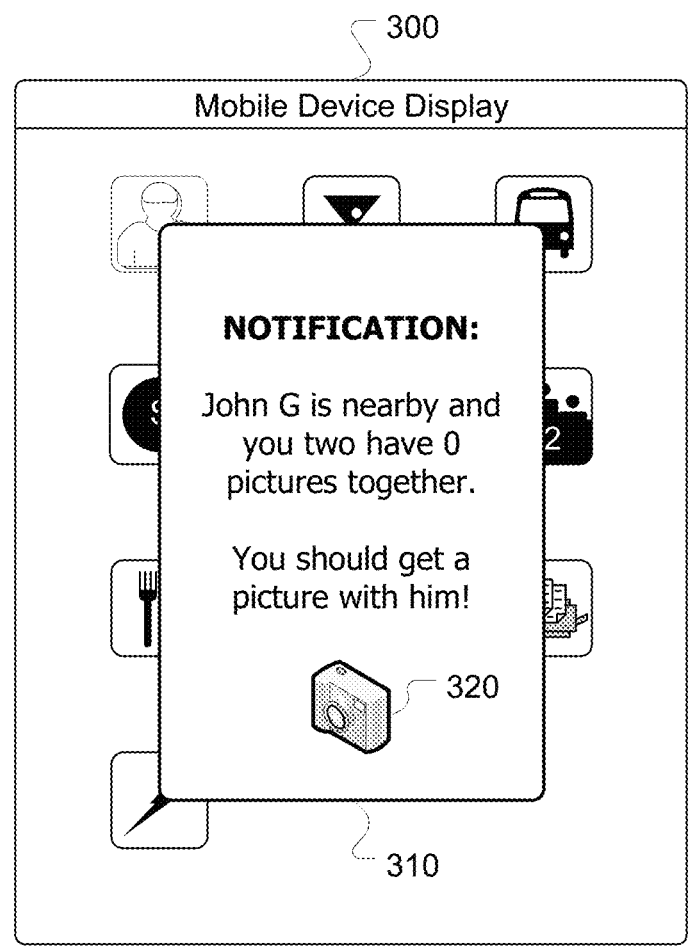
FIG. 3 is an illustration of an example user interface that includes a notification, according to one aspect of the subject technology.

For example, FIG. 3 is an illustration of an example user interface 300 that includes a notification 310, according to one aspect of the subject technology. The user interface 300 may be displayed to a user on the user's location-aware device, such as a smart phone or other mobile device. The notification 310 may be designed to inform the user that a member of the user's social graph is in the vicinity and to encourage the user to take a photograph with the member. The notification 310 may also notify the user that the user has fewer than the threshold number of pictures with the member. In some cases, the notification can indicate the specific number of photographs that the user has with the member.

According to one aspect of the subject technology, the notification may also include a interface element 320 configured to activate a camera on the user's location-aware device. This interface element 320 may be used to conveniently open a camera application on the device to take a photograph. In other aspects, the notification may automatically load the camera application and/or activate the camera on the user's location aware device.

Figure 4:
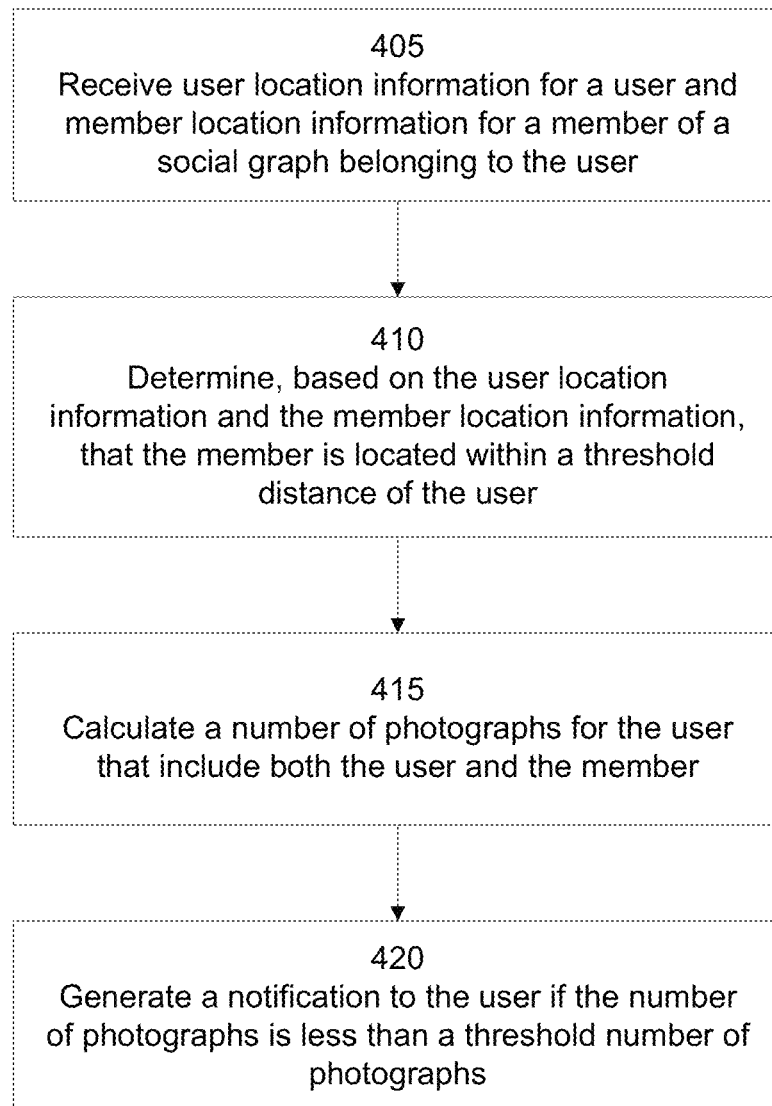
FIG. 4 is a flow chart illustrating an example process 400 for providing a user with a proximity-based notification, in accordance with various aspects of the subject technology.

FIG. 4 is a flow chart illustrating an example process 400 for providing a user with a proximity-based notification, in accordance with various aspects of the subject technology. Although the steps in process 400 are shown in a particular order, certain steps may be performed in different orders or at the same time. For example, in other variations, step 415 may occur before or at the same time as steps 405 or 415. In addition, although the process steps of FIG. 4 are described with reference to the components of the system 200 in FIG. 2, the steps are not limited to being performed by these components.

At step 405, the location module 205 receives user location information (e.g., GPS location coordinates) for a user and location information for a member of a social graph belonging to the user. In some cases, the location information may be received from a user's or a member's location-aware device. In other cases, however, the location information may be received from an intermediate source. For example, a user may publish his location, check-in to a location using an application that communicates with a third-party server, or be checked-in to a location by another user. The location module 205 may receive the location information of the user from the third-party server based on the published location or checked-in location.

In one aspect, the location information from the user and from the member may come from the same device. For example, a user may check-in, to a location, the user as well as a member of the user's social graph or the member may check-in the user and the member to the location. The user and the member may also be checked-in to a location by another third-party.

Based on the location information for the user and the member of the user's social graph, at step 410, the location module 205 may determined whether the member is located within a threshold distance of the user (e.g., within 50 feet of the user or within 50 feet of a location where the user is checked-in).

At step 415, the photo module 210 calculates a number of photographs for the user that include both the user and the member. The photo module 210 may determine the number of photographs that include both the user and the member by, for example, identifying individuals tagged in each of the photos or using facial recognition to identify individuals in the photographs. Other techniques may also be used. For example, the photo module 210 may use metadata associated with the photographs or optical character recognition to determine if one or more individuals are in each photograph.

If the number of photographs is less than a threshold number of photographs, the notification module 220 may generate a notification and transmit the notification to the user at step 420. For example, if the threshold number of photographs is 1 and the user has no photographs with a member of the user's social circle that is located within the distance threshold, the notification module 220 may generate a notification that informs the user that the member is nearby and the user has no photographs with the member.

If the threshold distance is small, providing the user with a notification that a member is nearby and they should take a picture together is less likely to violate the member's notion of privacy because since the user is most likely able to see the member and the user and the member are most likely out together.

According to another aspect of the subject technology, the notification module 220 may also generate notifications if one or more of the most recently taken or uploaded photographs that include both the user and the member are old. For example, the photo module 210 may determine that a photograph is old if the photograph is taken or uploaded before a threshold date (e.g., three months before the current date). Accordingly, even if the number of photographs that include both the user and the member of the user's social graph exceed the threshold number of photographs, a notification may still be generated informing the user that, for example, "John G is nearby and the most recent picture you have together was on [DATE]. You should get a picture with him." According to another aspect of the subject technology, photographs dated before the threshold date are not counted towards meeting the threshold number of photographs.

By providing a user with proximity-based notifications that informs the user that a member of the user's social graph is nearby and suggest taking a photograph with the member, the system may encourage the user to take more photographs with the members, especially if they have no pictures together or if their most recent picture together is old.

As described above with respect to FIG. 2, the social graph module 210 may also be configured to determine a degree of closeness between a user and a member of the user's social graph. According to some aspects of the subject technology, the threshold date used for a member to determine if a picture with the member is old may vary based on the degree of closeness between the user and the member. For example, if the degree of closeness between the user and the member is high, meaning the user and the member are close, the threshold date may be more recent (e.g., 2 months from the current date) and a notification may be generated if there are no photographs that include the member and the user after the threshold date. On the other hand, if the degree of closeness between the user and member is low, meaning the user and the member are not close, the threshold date may be less recent (e.g., 1 year from the current date) and a notification may be generated based on the less recent threshold date.

Similarly, the threshold number of photos used to determine whether a notification is sent may also vary based on the degree of closeness between a user and a member. For example, if the degree of closeness between the user and the member is high, the threshold number of photographs may be greater (e.g., 5 photographs) and a notification may be generated if there are fewer photographs that include the user and the member than the threshold number of photographs. On the other hand, if the degree of closeness between the user and member is low, the threshold number of photographs may be lower (e.g., 1 photograph) and a notification may be generated based on the lower threshold number.

By varying the threshold number of photographs and/or the threshold date used, a user may be encouraged to take more photographs with members of the user's social graph that the user is closer to. The user may receive more notifications to take photographs with members that the user is closer to and fewer notifications with members that the user is not as close with. As a result, the user may potentially have a greater number of photographs with members that the user is closer with.

Figure 5:
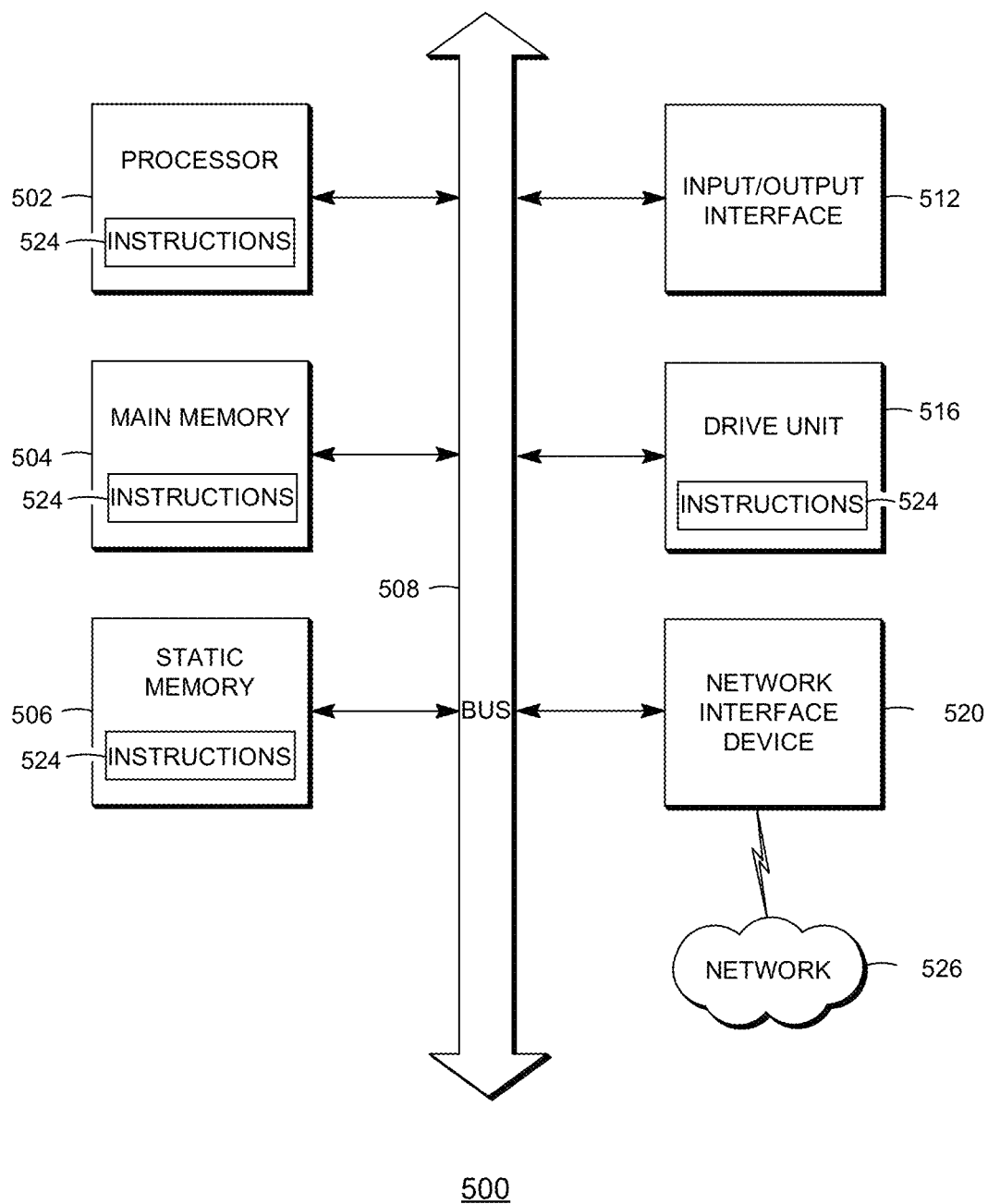
FIG. 5 is a block diagram illustrating an example computer system with which any of the devices, servers, or systems discussed herein may be implemented, in accordance with one aspect of the subject technology.

FIG. 5 is a block diagram illustrating an example computer system 500 with which any of the devices, servers, or systems discussed herein may be implemented, in accordance with one aspect of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for providing notifications about users in a social network are thus provided. For example, a user of a social networking service may receive notifications when one or more contacts (e.g., other individuals or entities that the user knows or possibly does not know) add the user to a social circle. In another aspect, the user may also receive notifications when contacts that the user has added to a social circle also adds the user to a social circle (e.g., the contact in one of the user's social circles has added the user back). According to still another aspect, the user may receive a notification when contacts that the user has invited to join the social networking service join the social networking service.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa.

A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for generating a proximity-based notification, the method comprising:
   receiving, by one or more computing devices, user location information for a user and member location information for a member of a social graph belonging to the user;
   determining, by the one or more computing devices, based on the user location information and the member location information, whether the member is located within a threshold distance of the user;
   calculating, by the one or more computing devices, a number of photographs associated with the user in which both the user and the member are depicted; and
   generating, by the one or more computing devices, a notification to the user if the member is located within the threshold distance of the user and if the number of photographs is less than a threshold number of photographs, the notification comprising a prompt to the user to take a photograph with the member.

2. The computer-implemented method of claim 1, further comprising:
   determining, by the one or more computing devices, a date of a most recent photograph in the number of photographs; and
   generating, by the one or more computing devices, a notification to the user if the date of the most recent photograph is before a threshold date.

3. The computer-implemented method of claim 2, further comprising determining, by the one or more computing devices, a degree of closeness between the user and the member.

4. The computer-implemented method of claim 3, wherein the threshold number of photographs is based on the degree of closeness between the user and the member.

5. The computer-implemented method of claim 3, wherein the threshold date is based on the degree of closeness between the user and the member.

6. The computer-implemented method of claim 1, wherein the user location information comprises location coordinates for the user received from a location-aware device associated with the user, and wherein the member location information comprises location coordinates for the member received from a location-aware device associated with the member.

7. The computer-implemented method of claim 1, wherein the user location information comprises a check-in to a particular location received from a mobile device, and wherein the member location information comprises a check-in to the particular location.

8. The computer-implemented method of claim 1, wherein the calculating of number of photographs for the user is performed in response to the determining of whether the member is located within the proximity threshold of the user.

9. The computer-implemented method of claim 1, further comprising transmitting, by the one or more computing devices, the notification to a mobile device associated with the user.

10. The computer-implemented method of claim 9, wherein the notification is configured to activate a camera feature on the mobile device for the user.

11. A system for generating a proximity-based notification, the system comprising:
    one or more processors; and
    one or more memory devices, the one or more memory devices storing computer-readable instructions that when executed by the one or more processors cause the one or more processors to perform operations, the operations comprising:
    receiving user location information for a user and member location information for a member of a social graph belonging to the user;
    determining, based on the user location information and the member location information, that the member is located within a threshold distance of the user;
    calculating a number of photographs associated with the user in which both the user and the member are depicted; and
    generating a notification to the user if the number of photographs is less than a threshold number of photographs, the notification comprising a prompt to the user to take a photograph with the member.

12. The system of claim 11, wherein the operations further comprise:
    determining a date of a most recent photograph in the number of photographs; and
    wherein the notification to the user is generated if the date of the most recent photograph is before a threshold date.

13. The system of claim 12, wherein the operations further comprise:
    determining a degree of closeness between the user and the member; and
    wherein at least one of the threshold number of photographs and the threshold date is based on the degree of closeness between the user and the member.

14. The system of claim 11, wherein the calculating of number of photographs for the user is performed in response to the determining that the member is located within the proximity threshold of the user.

15. A non-transitory machine-readable medium comprising instructions stored therein, which when executed by a machine, cause the machine to perform operations comprising:
    receiving user location information for a user and member location information for a member of a social graph belonging to the user;
    determining, based on the user location information and the member location information, whether the member is located within a threshold distance of the user;
    calculating a number of photographs associated with the user in which both the user and the member are depicted; and
    generating a notification to the user if the member is located within the threshold distance of the user and if the number of photographs is less than a threshold number of photographs, the notification comprising a prompt to the user to take a photograph with the member.

16. The non-transitory machine-readable medium of claim 15, wherein the calculating of number of photographs for the user is performed before the determining of whether the member is located within the proximity threshold of the user.

17. A computer-implemented method for generating a proximity-based notification, the method comprising:
- receiving, by one or more computing devices, user location information for a user and member location information for a member of a social graph belonging to the user;
- determining, by the one or more computing devices, based on the user location information and the member location information, whether the member is located within a threshold distance of the user;
- identifying, by the one or more computing devices, a date of a most recent photograph in which both the user and the member are depicted; and
- generating, by the one or more computing devices, a notification to the user if the member is located within the threshold distance of the user and if the date of the most recent photograph is before a threshold date, the notification comprising a prompt to the user to take a photograph with the member.

18. The computer-implemented method of claim 17, further comprising:
- calculating, by the one or more computing devices, a number of photographs for the user that include both the user and the member; and
- generating, by the one or more computing devices, a notification to the user if the number of photographs is less than a threshold number of photographs.

19. The computer-implemented method of claim 17, further comprising:
- determining, by the one or more computing devices, a degree of closeness between the user and the member; and
- wherein the threshold date is based on the degree of closeness between the user and the member.

20. The computer implemented method of claim 17, wherein the identifying of the date of the most recent photograph is performed in response to the determining that the member is located within the proximity threshold of the user.

* * * * *